United States Patent [19]

Miller

[11] Patent Number: 4,638,548

[45] Date of Patent: Jan. 27, 1987

[54] METHOD OF FORMING A HELICAL BALL SCREW MEMBER

[75] Inventor: Michael A. Miller, Metamora, Mich.

[73] Assignee: 20th Century Machine, Sterling Heights, Mich.

[21] Appl. No.: 578,379

[22] Filed: Feb. 8, 1984

[51] Int. Cl.$^4$ .......................... B23P 13/04; B24B 5/00; F16H 1/14

[52] U.S. Cl. ................................ 29/558; 74/424.8 R; 51/103 R

[58] Field of Search ................ 51/95 LH, 103 R, 287; 219/10.57; 29/558, 33 R; 74/424.8 A, 459

[56] References Cited

U.S. PATENT DOCUMENTS

| | | | |
|---|---|---|---|
| 1,967,482 | 7/1934 | Schmidt | 74/424.8 R |
| 2,375,991 | 5/1945 | Hoffar | 74/424.8 R |
| 2,795,091 | 6/1957 | Umbdenstock | 51/95 LH |
| 2,935,893 | 5/1960 | Mazur | 74/459 |
| 3,301,082 | 1/1967 | Kosinski | 74/459 |
| 3,638,507 | 2/1972 | Orner | 74/424.8 R |
| 3,728,829 | 4/1973 | Ellis | 51/103 R |
| 3,736,113 | 5/1973 | Umbdenstock et al. | 51/951 H |
| 4,100,387 | 7/1978 | Reinke et al. | 219/10.57 |
| 4,194,728 | 3/1980 | Stengel et al. | 219/10.57 |
| 4,441,280 | 4/1984 | Wetzels et al. | 51/103 R |

Primary Examiner—Howard N. Goldberg
Assistant Examiner—Steven Nichols
Attorney, Agent, or Firm—Remy J. VanOphem

[57] ABSTRACT

A method of forming a ball screw member from an elongated workpiece having an outer cylindrical surface, as well as the ball screw member formed by the method. A helical ball screw thread is machined on the outer cylindrical surface, the helical ball screw thread having a helical groove and a helical crest surface. An end journal or other end treatment is formed in the workpiece, the end journal or other end treatment being located during the forming operation relative to the helical crest surface. The outer cylindrical surface of the workpiece may be centerless ground prior to the machining of the helical ball screw thread. The helical crest surface may be ground after the machining of the helical ball screw thread to provide increased concentricity between components of the ball screw member. A high precision ball screw member may be formed from the ball screw member by performing a regrinding operation on the helical groove, the regrinding operation being positioned relative to the helical crest surface.

17 Claims, 5 Drawing Figures

METHOD OF FORMING A HELICAL BALL SCREW MEMBER

BACKGROUND OF THE INVENTION

The present invention is directed to external helical ball screw members and more particularly to an inexpensive method of making an external helical ball screw thread and associated end treatments on a workpiece.

Ball screw assemblies are in common use today on a variety of devices. Typically, a ball screw assembly consists of a ball screw member having an external helical ball nut thread, a nut having an internal helical ball screw thread fitted over the ball screw member and a plurality of bearing balls disposed partially within the external helical ball nut and the internal helical ball screw. The ball screw member may include a variety of end treatments, such as, but not limited to, an end journal, a transverse bore, and a screw thread, for positioning the ball screw member relative to other machine elements and for interconnecting the ball screw member with other machine elements.

Ball screw assemblies are often used because of their characteristics of providing a good load carrying capacity, both longitudinally and transversely of the ball screw member, low frictional resistance to displacement of the ball screw member relative to the nut, accurate translational positioning of the ball screw member relative to the nut, and accurate axial positioning of the ball screw member relative to the nut as the members are relatively displaced longitudinally. Therefore, the ball screw assemblies are often used in machinery requiring accurate translational positioning between various machine elements, particularly when extreme loads are experienced.

Numerous examples of devices using ball screw assemblies may be found in the prior art. For example, U.S. Pat. No. 2,924,265 to J. Himka, issued Feb. 9, 1960, uses a ball screw assembly and a device for adjusting a vehicle seat. U.S. Pat. No. 2,930,252 to R. E. Sears, et al., issued Mar. 29, 1960, discloses a valve control using a ball screw assembly. U.S. Pat. No. 2,935,893 issued to E. Mazur on May 10, 1960 and U.S. Pat. No. 1,967,482 issued to B. F. Schmidt on July 24, 1934 each show how a ball screw assembly may be used in a steering gear. U.S. Pat. No. 3,159,046 to J. L. Harned, et al., issued Dec. 1, 1964 shows the use of a ball screw assembly in a differential. An aircraft trim control using a ball screw assembly is taught in U.S. Pat. No. 2,772,841, issued Dec. 4, 1956 to D. H. Bonsteel. A ball screw assembly is used in various lifting jacks, as exemplified by U.S. Pat. No. 28,613, issued June 5, 1860 to C. F. Spencer. Ball screw assemblies are also typically used in worm gear drives, as disclosed in U.S. Pat. No. 3,672,239, issued to G. Titt on June 27, 1972.

Another common use for ball screw assemblies is in drive mechanisms, tool holders and drill feeds for various machine tools, as exemplified by U.S. Pat. Nos. 2,957,368 to J. Hendrickson, issued Oct. 25, 1960; 3,640,147 issued to G. Fantoni on Feb. 8, 1972; and 2,375,991 issued to H. S. Hoffar on May 15, 1945.

Numerous other uses for ball screw assemblies are well known in the art.

Two methods have been used in the past for forming external helical ball screw threads on the ball screw members of ball screw assemblies. The two methods differ substantially in cost and result in external helical ball screw threads and ball screw members of substantially differing accuracy.

The first method of the prior art is used to produce commercial or industrial quality ball screw members of moderate precision. The first method involves performing a rolling operation on the external cylindrical surface of a workpiece in order to form an external helical ball screw thread on the cylindrical surface thereof. The external helical ball screw thread produced by the rolling operation defines an irregular surface which is of little value for locating the end treatments for further operations. Therefore, all further operations on end treatments of the ball screw member formed according to the first method are typically located relative to the pitch diameter of the external helical ball screw thread. Subsequently, the workpiece is hardened. While the rolling operation is inexpensive, it does not result in a very accurate external helical ball screw thread. The external helical ball screw thread produced by the first method of the prior art is of moderate precision due to the difficulty of maintaining straightness and lead accuracy during a rolling operation. The location of end treatments relative to the external helical ball screw thread is of moderate precision as a result of difficulties arising from the angular disposition, due to lead angle, of locating pins which are used to locate the end treatments relative to the pitch diameter of the external helical ball screw thread. Furthermore, the process of positioning the end treatments using locating pins substantially increases the difficulty of forming the end treatments.

The second method of the prior art is used for making high precision ball screw members. The second method involves performing a rolling operation on the cylindrical surface of the ball screw member to form an external helical ball screw thread, forming, by suitable means, the end journal or other end treatment, heat treating the workpiece, and then regrinding the external helical ball screw thread to more accurate dimensions in relation to the end journal or other end treatment of the ball screw member. While this results in a far more accurately dimensioned and positioned ball screw assembly than the first method of the prior art, described above, it is also substantially more expensive to produce a ball screw member according to the second method than it is to produce one according to the first method.

What is needed, therefore, is a new method for producing commercial or industrial quality ball screw members which avoids the difficulties associated with the first method of the prior art with locating the end treatments of the ball screw member relative to the external helical ball screw thread. The new method preferably should be easier to carry out and to automate and yet result in a ball screw member of greater accuracy than that produced by the first method of the prior art. For many commercial purposes, a ball screw member is needed having an accuracy intermediate those provided by the first and second methods of the prior art. Accordingly, what is also needed is an inexpensive method for forming an external helical ball screw in a ball screw member, which method produces an external helical ball screw thread in a workpiece of intermediate accuracy between the above described methods at a cost substantially less than that required to produce an external helical ball screw according to the second above described method of the prior art.

SUMMARY OF THE PRESENT INVENTION

The present invention provides an inexpensive method for forming an external helical ball screw thread in a workpiece, the external helical ball screw thread being of an intermediate accuracy, relative to previous methods for forming external helical ball screws. The method of the present invention avoids the difficulty of using locating pins associated with the first method of the prior art and further avoids the expensive regrinding operation associated with the second method.

In particular, the method of the present invention provides for the formation of a ball screw member in a workpiece having a first end, a second end opposite the first end, a longitudinal axis extending from the first end to the second end, a cylindrical portion interposed the first end and the second end, and a cylindrical outer surface on the cylindrical portion. The method includes two machining steps. The first machining step provides for the machining of an external helical ball screw thread in the cylindrical outer surface, the external helical ball screw thread being located during the first machining step relative to the cylindrical outer surface. The external helical ball screw thread has a partial circular cross-sectioned helical groove and defines a helical crest surface adjacent thereto. The second machining step provides for machining an end journal or other end treatment at the first end of the workpiece, the end journal or other end treatment being located during the second machining step relative to the helical crest surface of the external helical ball screw thread.

In the preferred embodiment, the cylindrical outer surface is centerless ground before the above recited first and second machining steps are carried out. Furthermore, in the preferred embodiment, the workpiece is induction hardened between the first and second machining steps. If needed, the helical crest surface may be centerless ground between the first and second machining step.

A principal object of the present invention is to provide a method of producing a helical ball screw thread of a predetermined intermediate accuracy on a ball screw member. Another object of the present invention is to provide an inexpensive method of producing an external helical ball screw thread on a workpiece. In particular, it is an object of the present invention to provide a method of producing an external helical ball screw member of commercial or industrial quality and having a precision intermediate that produced by the two methods of the prior art described in the background. Furthermore, it is an object of the present invention to provide a method of producing an external helical ball screw member of commercial or industrial quality which avoids the use of locating pins or a regrinding step.

These and the many other objects, features and advantages of the present invention will become apparent to those skilled in the art when the following detailed description of the preferred embodiment is read in conjunction with the drawings appended hereto.

DETAILED DESCRIPTION OF THE PREFERRED EMBODIMENT

Figure 1:
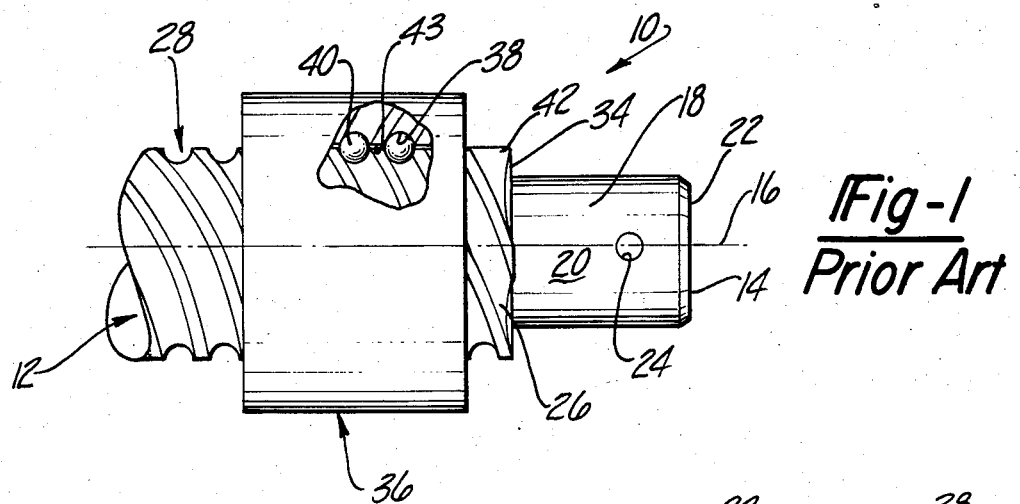
FIG. 1 is a partially cutaway view of a portion of a ball screw assembly of the prior art.
Figure 2:
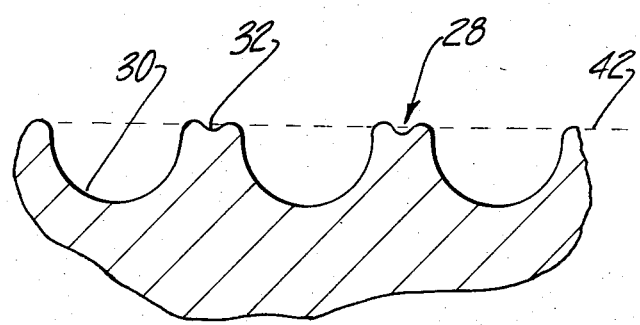
FIG. 2 is an enlarged partial sectional view through a ball screw member formed according to a prior art method.

Referring now to the drawing, and more particularly to FIGS. 1 and 2 thereof, a typical ball screw assembly 10 and a typical ball screw member 12 of the prior art are illustrated. The ball screw assembly 10 and the ball screw member 12 are exemplary of those which may be made according to the method of the present invention.

The ball screw member 12 according to the prior art is an elongated member having a first end 14 and a second end, not illustrated, disposed remote from the first end. A longitudinal axis 16 extends between the first end 14 and the second end.

The first end 14 of the ball screw member 12 is provided with suitable end treatments for cooperation with various machine elements. The ball screw member 12 illustrated is provided with an end journal 18 having an end journal cylindrical surface 20 for rotatably mounting the ball screw member 12. The end journal 18 may be provided with a first end surface 22 normal to the longitudinal axis 16 as well as an aperture 24 extending transversely through the end journal. The aperture 24 may be used for interconnecting the ball screw member 12 with other machine elements of the device, not illustrated, utilizing the ball screw assembly 10.

The ball screw member 12 is further provided with an enlarged cylindrical portion 26 interposed the first end 14 and the second end. An external helical ball screw thread 28 is formed on the enlarged cylindrical portion 26. As shown in FIG. 2, the external helical ball screw thread includes at least one helical groove 30 having a partial circular cross-section. At least one helical crest 32 is formed adjacent the helical groove 30. As depicted in FIG. 1, a flat radial shoulder 34 is formed between the enlarged cylindrical portion 26 of the ball screw member 12 and the end journal cylindrical surface 20 thereof.

A nut 36, well known in the art, or described herein in any further detail, is fitted over the enlarged cylindrical portion 26 of the ball screw member 12. The nut is provided with an internal helical ball screw 38 complementing the external helical ball screw thread 28 of the ball screw member 12. A plurality of bearing balls 40 are interposed the external helical ball screw thread 28 and the internal helical ball screw 38 in a known manner.

Referring to FIG. 2, a detailed partial view of the external helical ball screw 28 of a ball screw member 12 made according to prior art methods is illustrated.

When the ball screw member 12 is made according to a first method of the prior art, the external helical ball screw thread 28 is initially formed from the original cylindrical surface 42 of the enlarged cylindrical portion 26 by a rolling operation. The helical groove 30 formed by the rolling operation typically has a tolerance of within twelve thousandths of an inch (0.012 in) per linear foot.

The rolling operation produces a helical crest 32 having an irregular surface, as indicated in FIG. 2. The helical crest 32 is, therefore, of little use in locating end treatments relative to the external helical ball screw thread 28 for subsequent machining operations. If forming and finishing operations on the end treatments are located relative to the surface defined by the helical crest 32, a substantial inaccuracy is introduced by the irregularity of the surface. Furthermore, due to the helix angle of the helical groove 30, the helical groove is difficult to use for locating and machining end treatments relative to the external helical ball screw thread 28. The use of locating pins to locate the finishing operations on end treatments relative to the pitch diameter of the helical groove 30, as is well known, is more accurate using the helical crest 32 for locating end treatments but is difficult to perform and to automate.

Some of the end treatments of the ball screw member 12 may be located relative to other end treatments. For example, the end treatments, such as the first end surface 22, the aperture 24, and the flat radial shoulder 34 illustrated in FIG. 1, may be located relative to the end journal cylindrical surface 20 after the end journal cylindrical surface has been located relative to the helical crest 32 or the helical groove 30.

The first method of the prior art described above is used for the production of commercial or industrial quality ball screw members of moderate precision.

While the ball screw member 12 produced by the rolling operation is comparatively inexpensive, the tolerance build-up between the helical groove 30 and the various end treatments is unacceptable for some purposes. Therefore, according to an alternate method of the prior art, an additional grinding operation is typically performed on the helical groove 30 to reduce this tolerance build-up after at least one preselected end treatment has been located. The grinding tool for the regrinding operation on the helical groove 30 is positioned relative to the preselected end treatment of the ball screw member 12, the preselected end treatment typically being the end journal cylindrical surface 20. The regrinding operation substantially reduces the tolerance build-up between the end treatments and the helical groove 30 to within two to five ten thousandths of an inch (0.0002 to 0.0005 in.) per linear foot.

While the second method of the prior art results in an extremely accurate ball screw member 12 of high precision, it is also extremely expensive to perform the regrinding operation. Therefore, the second method of the prior art is only used when a high precision ball screw member is needed.

Furthermore, the second method of the prior art still results in a helical crest 32 of irregular shape. Therefore, a substantial gap must be provided between the helical crest 32 of the external helical ball screw thread 28 and the corresponding helical crest 43 of the internal helical ball screw of the nut in order to avoid engagement of portions of the helical crest 32 with portions of the helical crest 43.

As will shortly be apparent to those skilled in the art, these shortcomings of the first and second methods of the prior art, described above, are avoided by using the method of the present invention to form an external helical ball screw on a ball screw member.

Figure 3:
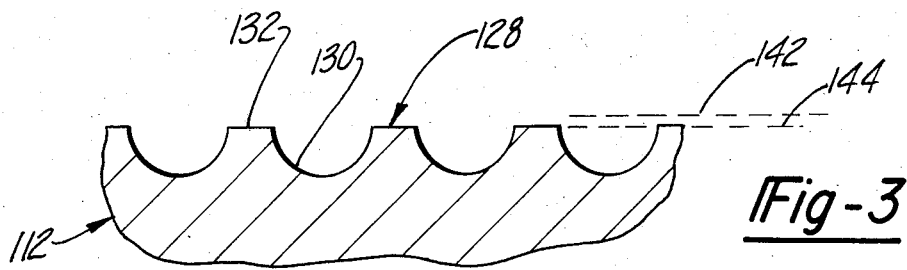
FIG. 3 is an enlarged partial sectional view through a ball screw member formed according to the method of the present invention.
Figure 5:
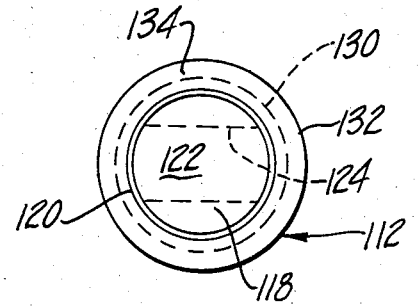
FIG. 5 is an end view of the ball screw member of FIG. 4.
Figure 4:
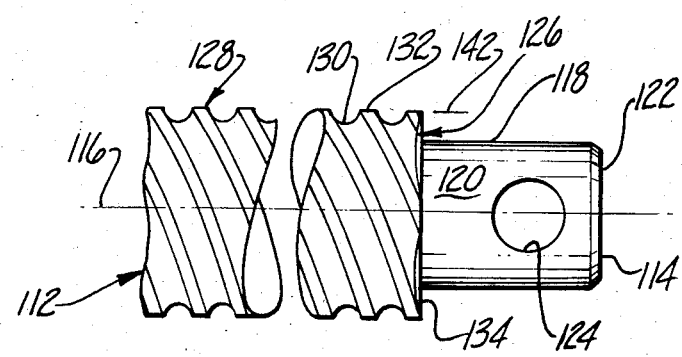
FIG. 4 is a plan view of a ball screw member according to the present invention.

According to the method of the present invention, a ball screw member 112, shown in FIGS. 3, 4 and 5, is formed from a workpiece similar to that used for the ball screw member 12 described above. As shown in FIG. 4, the ball screw member 112 has a first end 114 and a second end, not illustrated, disposed remote from the first end. A longitudinal axis 116 extends from the first end 114 towards the second end of the ball screw member 112. Certain end treatments are provided at the first end 114 from the ball screw member, such as an end journal 118 having an end journal cylindrical surface 120, a first end surface 122, and a transverse aperture 124.

The ball screw member 112 is further provided with an enlarged cylindrical portion 126 for the formation of an external helical ball screw 128 having at least one helical groove 130 and a helical crest 132. Finally, a flat radial shoulder 134 is formed between the enlarged cylindrical portion 126 and the end journal cylindrical surface 120.

According to the method of the present invention, and as best shown in FIG. 3, the original cylindrical surface 142, shown only schematically, of the enlarged cylindrical portion 126 of the ball screw member 112 is machined to a predetermined tolerance by a centerless grinding operation to provide a new cylindrical surface 144. Next, one or more helical grooves 130 are machined in the new cylindrical surface 144. The machining operation producing the helical groove 130 is positioned relative to the new cylindrical surface 144. It should be noted that when the helical groove 130 is machined, the helical crest 132 formed adjacent thereto will be substantially unaffected by the machining operation. Thus, the helical crest 132 will define a helical crest surface substantially identical to the new cylindrical surface 144 described above. The helical groove 130 will be accurate to within three thousandths of an inch (0.003 in.) per linear foot. It should be noted that this tolerance build-up is of an intermediate magnitude between that which is experienced by the two prior art methods of forming the helical groove 30 in the ball screw member 12. In practice, this intermediate tolerance build-up is satisfactory for many applications.

Accordingly, the helical crest surface 144 may be used after the helical groove 130 has been machined so as to accurately position machining tools used for final machining operations on the end treatments of the ball screw member 112 or to locate the ball thread for remachining, if necessary. Furthermore, if the machining operation used for forming the helical groove 130 causes flaws in the helical crest surface 144, a second centerless grinding operation may be performed on the helical crest surface 144 to clean up the helical crest surface, if necessary, so it may be reliably used for locating the end treatments relative to the ball screw member 112.

According to the method of the present invention, the workpiece from which the ball screw member 112 is formed is preferably induction hardened after the helical groove 130 is machined. If desired, the end journal 118 may also be induction hardened at this time.

Next, the finishing operations may be performed on the various end treatments of the ball screw member 112. The tools used for the finishing operations on the end treatments of the ball screw member 112 are accurately positioned relative to the helical crest surface 144. The finishing operations may include machining the end journal cylindrical surface 120 to reduce the tolerance build-up between the end journal cylindrical surface and the external helical ball screw thread 128.

Other machining operations which may be applied to the end treatments of the ball screw member 112 relative to the helical crest surface 132 or the new helical crest surface 144 include drilling of the transverse aperture 124, and face grinding the first end surface 122 and the flat radial shoulder 134. It will be appreciated by those skilled in the art that various other machine operations may be provided to other suitable end treatments for the ball screw member 112 at this time.

It will be appreciated by those skilled in the art that locating these finishing operations relative to the helical crest surface 144 is more easily accomplished than using locating pins or a regrinding operation and further that it may be easily automated. The method of the present invention provides a ball screw member 112 having a tolerance build-up between the helical groove 130 and the various end treatments of the ball screw member which is intermediate those provided by the above described methods of the prior art. Nonetheless, the method of the present invention is less expensive to perform on a workpiece than either of the prior art methods. Thus, for those applications where a tolerance in the range of a few thousandths of an inch is acceptable, the method of the present invention is highly desirable as a cost savings. Furthermore, the method of the present invention provides a ball screw member 112 having a substantially improved positioning accuracy, straightness, concentricity, and consistency of outer diameter than the ball screw member 12 of the prior art produced by a rolling operation alone, without a subsequent machining operation.

Furthermore, since the helical crest surface 144 produced according to the method of the present invention is substantially straight and round, it may, if desired, be proportioned closer to the dimensions of the helical crest 43, shown in FIG. 1, of the internal helical ball screw 38 of the nut 36 which is used in conjunction with the ball screw member 112 of FIGS. 3 through 5.

Finally, a high precision ball screw member may be formed from the ball screw member 112 described above by performing a regrinding operation to regrind the helical groove 130 to a higher accuracy. The regrinding operation may be located relative to the helical crest surface 144, resulting in a high precision ball screw member of greater accuracy than the high precision ball screw member of the prior art.

The above description constitutes the best mode contemplated at the time of filing by the inventor for carrying out the present invention. It will be apparent to those skilled in the art that many variations and modifications may be made therefrom without departing from the spirit of the present invention. Such variations and modifications are within the intended scope of the claims appended hereto.

What is claimed as novel is as follows:

1. A method of forming a ball screw member from a workpiece having a first end, a second end opposite said first end, a longitudinal axis extending from said first end to said second end, a cylindrical portion interposed said first end and said second end, and a cylindrical outer surface on said cylindrical portion, said method comprising:
    a first machining step of machining a helical ball screw thread in said cylindrical outer surface, said helical ball screw thread being located during said first machining step relative to said cylindrical outer surface, said helical ball screw thread having a partial circular cross-sectioned helical groove and a helical crest surface adjacent thereto; and
    a second machining step of machining end treatments on said workpiece adjacent said first end of said workpiece, said end treatments being located during said second machining step relative to said helical crest surface.

2. The method of claim 1 further comprising before said first machining step the additional step of centerless grinding said cylindrical outer surface of said cylindrical portion of said workpiece.

3. The method of claim 1 further comprising between said first and second machining steps the additional step of induction hardening said cylindrical portion of said workpiece.

4. The method of claim 1 further comprising between said first and second machining steps an intermediate machining step of centerless grinding said helical crest surface of said helical ball screw thread.

5. The method of claim 1 further comprising between said first and second machining steps the additional step of induction hardening said cylindrical portion and said first end of said workpiece.

6. The method of claim 1 further comprising after said first machining step the additional step of machining an end face on at least one end of said first and second ends of said workpiece, said end face being located during said additional machining step relative to said helical ball screw thread.

7. The method of claim 1 wherein said end treatments comprises an end journal axially aligned with said helical ball screw thread.

8. The method of claim 1 further comprising after said second machining step a step of regrinding said partial circular cross-sectioned helical groove relative to said helical crest surface.

9. A method of forming a ball screw member from a workpiece, having a first end, a second end opposite said first end, a longitudinal axis extending from said first end to said second end, a cylindrical portion interposed said first end and said second end, and a cylindrical outer surface on said cylindrical portion, said method comprising:
    a first machining step of centerless grinding said cylindrical outer surface of said cylindrical portion of said workpiece;
    a second machining step of machining a helical ball screw thread in said cylindrical outer surface, said helical ball screw thread being located during said second machining step relative to said cylindrical outer surface, said helical ball screw thread having a partial circular cross-sectioned helical groove and a helical crest surface adjacent thereto; and
    a third machining step of machining an end journal at said first end of said workpiece, said end journal being located during said third machining step relative to said helical crest surface.

10. The method of claim 9 further comprising between said second and third machining steps the additional step of induction hardening said cylindrical portion of said workpiece.

11. The method of claim 9 further comprising after said second machining step the additional step of induction hardening said cylindrical portion and said first end of said workpiece.

12. The method of claim 9 further comprising between said second and third machining steps an intermediate machining step of centerless grinding said helical crest surface of said helical ball screw.

13. The method of claim 10 further comprising after said second machining step the additional machining step of machining an end face on at least one end of said first and second ends of said workpiece.

14. The method of claim 13 wherein said end face is located during said additional machining step relative to said helical crest surface.

15. The method of claim 9 further comprising after said first machining step the additional step of forming mounting means in said workpiece adjacent one end of said first and second ends, said mounting means being located during said additional step relative to said helical crest surface.

16. A method of forming a ball screw member from a workpiece, having a first end, a second end opposite said first end, a longitudinal axis extending from said first end to said second end, a cylindrical portion interposed said first end and said second end, and a cylindrical outer surface on said cylindrical portion, said method comprising:

a first machining step of centerless grinding said cylindrical outer surface of said cylindrical portion of said workpiece;

a second machining step of machining a helical ball screw thread in said cylindrical outer surface, said helical ball screw thread being located during said second machining step relative to said cylindrical outer surface, said helical ball screw thread having a partial circular cross-sectioned helical groove and a helical crest surface adjacent thereto;

a hardening step of induction hardening said cylindrical portion of said workpiece;

a third machining step of centerless grinding said helical crest surface of said helical ball groove; and a fourth machining step of machining an end journal at said first end of said workpiece, said end journal being located during said fourth machining step relative to said helical crest surface.

17. The method of claim 16 further comprising after said third machining step a step of regrinding said partial circular cross-sectioned helical groove relative to said helical crest surface.

* * * * *

UNITED STATES PATENT AND TRADEMARK OFFICE
CERTIFICATE OF CORRECTION

PATENT NO. : 4,638,548

DATED : Jan. 27, 1987

INVENTOR(S) : Michael A. Miller

It is certified that error appears in the above-identified patent and that said Letters Patent is hereby corrected as shown below:

Column 9, line 1, delete "10" and insert ---- 9 ----.

Signed and Sealed this

Twenty-seventh Day of October, 1987

Attest:

DONALD J. QUIGG

Attesting Officer

Commissioner of Patents and Trademarks